(12) United States Patent
Satzler et al.

(10) Patent No.: US 7,628,235 B2
(45) Date of Patent: Dec. 8, 2009

(54) TRACK ROLLER UNIT

(75) Inventors: Ronald L. Satzler, Princeville, IL (US); David C. Jansen, Metamora, IL (US)

(73) Assignee: CLAAS Industrietechnik GmbH, Paderborn (DE)

( * ) Notice: Subject to any disclaimer, the term of this patent is extended or adjusted under 35 U.S.C. 154(b) by 343 days.

(21) Appl. No.: 11/609,922

(22) Filed: Dec. 13, 2006

(65) Prior Publication Data

US 2007/0236085 A1  Oct. 11, 2007

(30) Foreign Application Priority Data

Mar. 30, 2006  (DE)  ......................... 10 2006 015 153

(51) Int. Cl.
*B62D 55/02* (2006.01)
(52) U.S. Cl. .................... 180/9.21; 180/9.1; 180/9.32
(58) Field of Classification Search ............... 180/9.21, 180/9.1, 9.32
See application file for complete search history.

(56) References Cited

U.S. PATENT DOCUMENTS

| | | | | |
|---|---|---|---|---|
| 1,922,768 A * | 8/1933 | Kegresse | .................. | 180/9.58 |
| 2,467,947 A * | 4/1949 | Skelton | ...................... | 180/9.5 |
| 3,447,620 A * | 6/1969 | Schoonover | ............... | 180/9.52 |
| 3,774,708 A * | 11/1973 | Purcell et al. | ................ | 180/9.5 |
| 4,361,363 A * | 11/1982 | Livesay | ...................... | 305/125 |
| 4,817,746 A * | 4/1989 | Purcell et al. | ................ | 180/9.1 |
| 4,819,754 A * | 4/1989 | Purcell et al. | ................ | 180/9.1 |
| 4,874,052 A * | 10/1989 | Purcell et al. | ................ | 180/9.1 |
| 5,273,126 A * | 12/1993 | Reed et al. | .................. | 180/9.21 |
| 5,775,447 A * | 7/1998 | Dester et al. | ................. | 180/9.1 |
| 5,997,109 A * | 12/1999 | Kautsch | ...................... | 305/129 |
| 6,283,562 B1 * | 9/2001 | Tsubota et al. | .............. | 305/135 |
| 6,655,482 B2 * | 12/2003 | Simmons | ..................... | 180/9.1 |
| 6,840,338 B2 * | 1/2005 | Bowers et al. | ............. | 180/9.54 |
| 7,255,184 B2 * | 8/2007 | Loegering et al. | .......... | 180/9.26 |

FOREIGN PATENT DOCUMENTS

DE  1 205 844  11/1965

* cited by examiner

*Primary Examiner*—Lesley D Morris
*Assistant Examiner*—Michael R Stabley
(74) *Attorney, Agent, or Firm*—Michael J. Striker

(57) ABSTRACT

A track roller unit for a vehicle has at least one pivotable subframe, at least one further pivotable subframe, wherein each of the subframes rotatably accommodates at least one land wheel, at least one subframe is pivotably mountable on the vehicle, and at least the further substrate is pivotally mounted on the one subframe.

11 Claims, 4 Drawing Sheets

TRACK ROLLER UNIT

CROSS-REFERENCE TO A RELATED APPLICATION

The invention described and claimed hereinbelow is also described in German Patent Application DE 10 2006 015 153.4 filed on Mar. 30, 2005. This German Patent Application, whose subject matter is incorporated here by reference, provides the basis for a claim of priority of invention under 35 U.S.C. 119(a)-(d).

BACKGROUND OF THE INVENTION

The present invention relates to a track roller unit.

Publication DE 1 205 844 makes known a rail belt track assembly composed of two oscillating levers which are joined by lateral sliding joints and which are supported on a bolt, as the common rotation point. Track assembly wheels are supported on the ends of both oscillating levers, and an endless rail belt wraps around the drive assembly wheels. A compression spring is located between the two oscillating levers, which pulls the oscillating levers toward each other and limits the motion of the oscillating levers relative to each other.

The disadvantage of this known rail belt track assembly is the fact that the known rail belt track assembly cannot evenly distribute the mass of the vehicle on the ground when the vehicle is driven over an obstacle.

SUMMARY OF THE INVENTION

The object of the present invention, therefore, is to avoid the disadvantages of the related art and, in particular, to create a crawler track assembly, with which the crawler track assembly transfers the mass of the vehicle over the entire ground contact surface in a ground-saving manner by virtue of the fact that the load is distributed evenly over the ground, even when the vehicle is driven over an obstacle or uneven ground.

In keeping with this object and with others which will become apparent hereinafter, one feature of the present invention resides, briefly stated, in a track roller unit for a vehicle, comprising at least one pivotable subframe; at least one further pivotable subframe, each of said subframes rotatably accommodating at least one land wheel, at least said first subframe being pivotably mountable on the vehicle; at least said one further substrate being pivotally mounted on said first subframe.

Due to the fact that the first subframe, at least, is pivotably mounted on the vehicle and the at least one further subframe is pivotably mounted on the first subframe, it is ensured that the weight of the vehicle is transferred to the ground in a ground-saving manner, even when the vehicle is driven over uneven ground or an obstacle, by virtue of the fact that the load is distributed evenly over the ground.

In an advantageous embodiment of the present invention, the first subframe is mounted on the vehicle such that it can pivot around a first pivot axis, and the further subframe is mounted on the first subframe such that it can pivot around a second pivot axis; this results in a simple, easily-installable design of the track roller unit.

Due to the fact that the first pivot axis is advantageously located approximately in the middle between the land wheels, a symmetrical arrangement of the crawler track assembly on the vehicle results.

In a further advantageous embodiment of the present invention, the second pivot axis is located off-center between the land wheels in the region of the land wheels, the second pivot axis being located closer to the axis of rotation of the land wheel on the further subframe than to the axis of rotation of the land wheel on the first subframe, so that the land wheel on the further subframe is hinge-mounted to the first subframe via a short lever.

Due to the fact that at least one damping element is located between the first subframe and the further subframe—the damping element being connected with the first subframe and the second subframe—the vibrations in the track roller unit are suppressed, and/or the vibrations can diminish more quickly in the track roller unit.

In an advantageous embodiment of the present invention, the damping element is hinge-mounted on the subframe above and/or below the second axis of rotation, so that the vibrations of the deflected second subframe are suppressed.

In an advantageous embodiment of the present invention, the damping element is designed as a piston-cylinder unit, in order to attain effective damping that is a function of the deflection speed of the land wheels.

To absorb the impacts introduced into the track roller unit via the uneven ground, in an advantageous refinement of the present invention, at least one spring element is located between the first subframe and the second subframe, the spring element being designed as an elastic rubber element.

Due to the fact that, in an advantageous embodiment of the present invention, the track roller unit includes a track-supporting roller assembly, and the track-supporting roller assembly is pivotably mounted on one of the subframes and is preloaded by a damping system hinge-mounted to this subframe or the second subframe, the track roller unit can adapt itself flexibly to the uneven ground.

In an advantageous embodiment of the present invention, the damping system is fixedly mounted on the subframe, so that the damping system remains on the subframe when the track-supporting roller assembly is replaced.

Due to the fact that the damping system is connected to the particular subframe above or below the first pivot axis, a damping system can be located between the land wheels in a space-saving manner.

To optimize the adaptability of the track-supporting roller assembly to an uneven ground surface, the track-supporting roller assembly—according to an advantageous refinement of the present invention—is mounted on an intermediate frame such that it can pivot around a third pivot axis, the intermediate frame being pivotably mounted on at least one subframe.

The support load of the vehicle is transferred to the ground such that it is evenly distributed over the ground contact surface of the track roller unit by virtue of the fact that the third pivot axis is located approximately in the middle between the land wheels in the area between the land wheels and below the first pivot axis and below the second pivot axis.

To increase the contact pressure of the crawler belt on the ground, the track-supporting roller assembly advantageously includes a pendulum with several track-supporting rollers, the pendulum being pivotably connected with the intermediate frame.

Further advantageous embodiments are the subject of further subclaims and are described in greater detail below with reference to exemplary embodiments shown in a plurality of figures.

The novel features of which are considered as characteristic for the present invention are set forth in particular in the appended claims. The invention itself, however, both as to its construction and its method of operation, together with additional objects and advantages thereof, will be best understood

DESCRIPTION OF THE PREFERRED EMBODIMENTS

Figure 1:
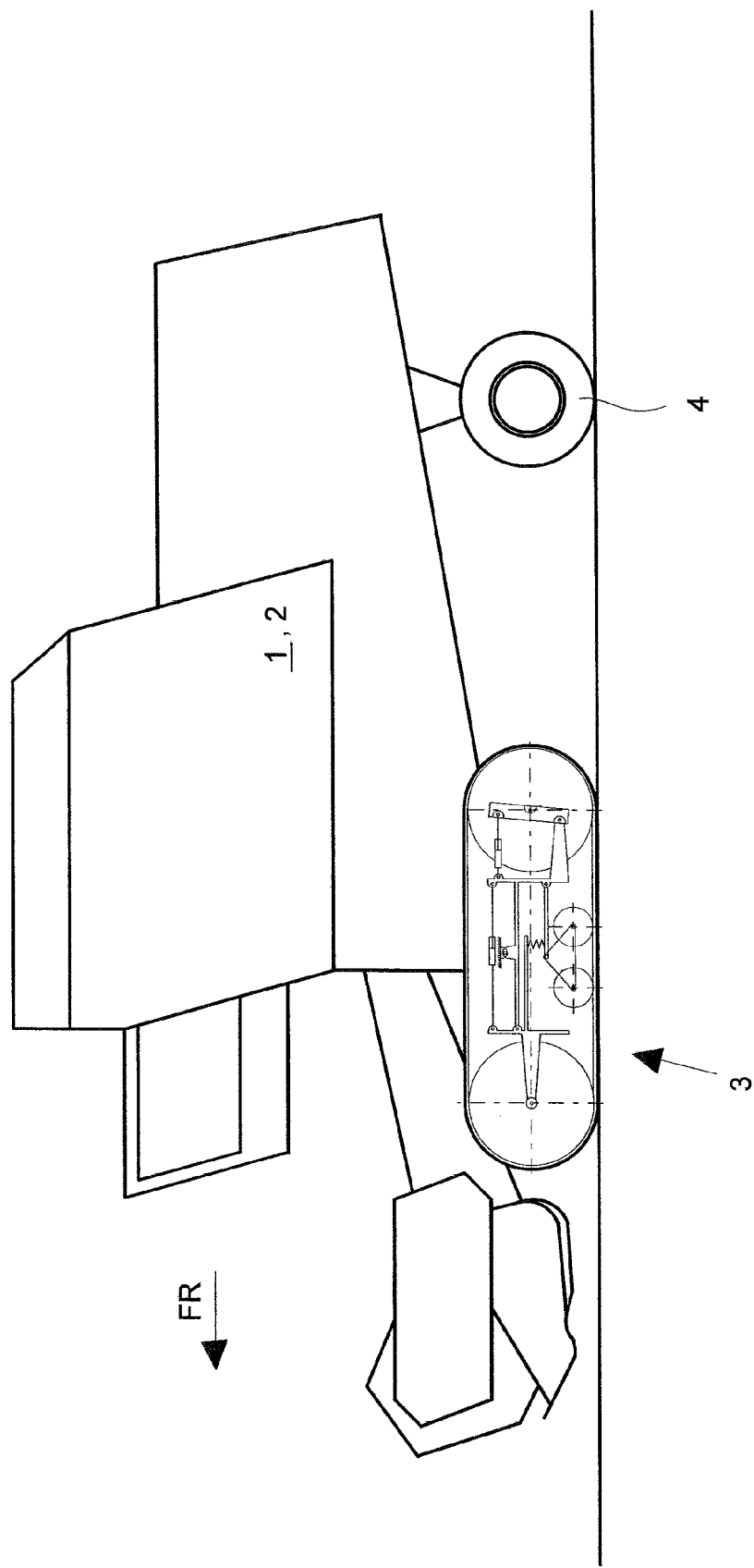
FIG. 1 shows a side view of a combine harvester equipped with track roller units according to the present invention.

A side view of a vehicle 2 designed as a combine harvester 1 is shown in FIG. 1. Instead of wheels, which are typically used, crawler track assemblies 3 are mounted on the front of combine harvester 1, on both sides. Together with two steerable wheels 4 located in the rear region of combine harvester 1, crawler track assemblies 3 form the ground drive of combine harvester 1.

Figure 2:
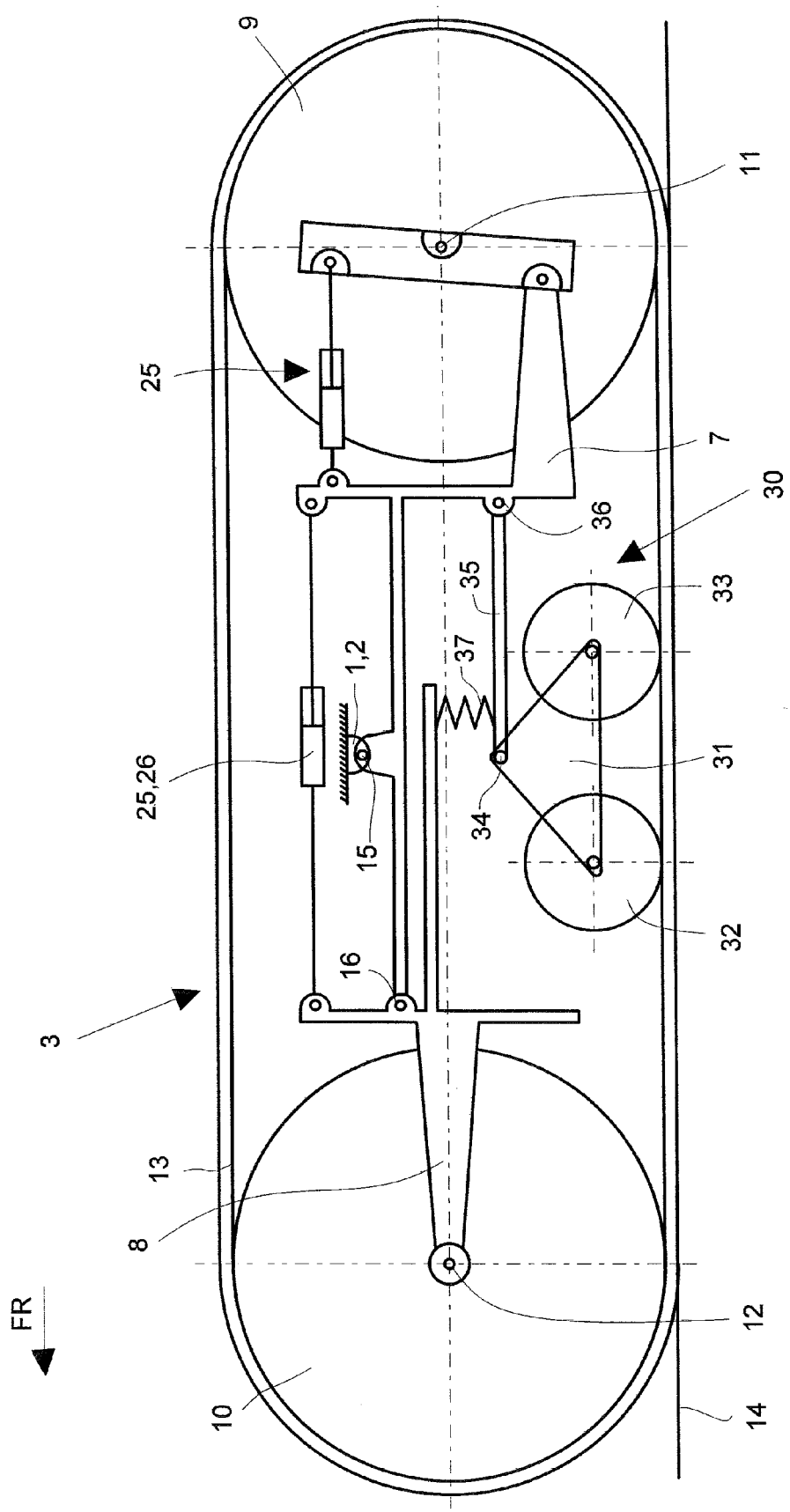
FIG. 2 shows a side view of a track roller unit according to the present invention.

FIG. 2 shows an enlarged schematic side view of a first embodiment of an inventive crawler track assembly 3. Crawler track assembly 3 includes a first pivotable subframe 7 and a further pivotable subframe 8, on the free ends of which a land wheel 9, 10 is supported such that it can rotate around an axis of rotation 11, 12. An endless crawler belt 13 wraps around the two land wheels 9, 10.

According to the present invention, to ensure that crawler belt 13 covers the largest possible ground contact area, even when the vehicle is driven on uneven ground, in order to transfer the weight of combine harvester 1 to ground 14 in a ground-saving manner by distributing the load evenly over the ground, first subframe 7 is pivotably mounted on combine harvester 1, and further subframe 9 is pivotably mounted on first subframe 7.

First subframe 7 is pivotably mounted on combine harvester 1 such that it can pivot around a pivot axis 15 extending transversely to direction of travel FR of combine harvester 1, the first pivot axis being located approximately in the middle between land wheels 9, 10. Second subframe 8 is pivotably connected with first subframe 7 such that it can pivot around a further pivot axis 16 extending in parallel with first pivot axis 15, second pivot axis 16 being located closer to axis of rotation 12 of land wheel 10 on further subframe 8 than to axis of rotation 11 of land wheel 9 on first subframe 7.

When the vehicle is driven over an obstacle or uneven ground, further subframe 8 is permanently swiveled around second pivot axis 16 relative to first subframe 7; as a result, the position of land wheel 10 and, therefore, its axis of rotation 12, changes relative to pivot axes 15, 16.

A damping element 26 designed as a piston-cylinder unit 25 is located above second axis of rotation 16 between first subframe 7 and further subframe 8, which is hingedly connected with first subframe 7 on the piston rod side, and is hingedly connected with further subframe 8 on the piston rod side. Piston-cylinder unit 25 can be designed, e.g., as a hydraulic damping element 26 filled with oil, or as a pneumatic damping element 26 filled with gas.

It is within the scope of the present invention to locate several damping elements 26 between first subframe 7 and second subframe 8, which can be hinge-mounted to subframes 7, 8 above and/or below second pivot axis 16.

In the exemplary embodiment shown, a track-supporting roller assembly 30 is located on first subframe 7, which is composed of a pendulum 31 with several track-supporting rollers 32, 33 located one behind the other in direction of travel FR of combine harvester 1. Pendulum 31 is connected with an intermediate frame 35 such that it can pivot around a third pivot axis 34, intermediate frame 35 being connected with first subframe 7 such that it is height-adjustable around a fourth pivot axis 36. Third pivot axis 34 is located approximately in the middle between land wheels 7, 8 in the region of land wheels 7, 8 below first pivot axis 15 and second pivot axis 16.

A further damping system 37 is fixedly mounted on subframe 8 between intermediate frame 35 and further subframe 8, below first pivot axis 15. Damping system 37 preloads track-supporting roller assembly 30 and absorbs the impacts transferred to track-supporting roller assembly 30 when the vehicle is driven over uneven ground. An embodiment is feasible with which track-supporting roller assembly 30 is pivotably mounted on one of the subframes 7, 8, and track-supporting roller assembly 30 is preloaded by damping element 37.

The position of land wheel 9 supported on first subframe 7 is changeable relative to land wheel 10 supported on further subframe 8 using a tensioning device 38 that is known per se and is therefore not explained in detail such that crawler belt 13 that is wrapped around the two land wheels 9, 10 can be tightened.

It is also within the framework of the present invention that one or both land wheels 9, 10 of crawler track assembly 3 shown can be driven, it being possible for driven land wheel (s) 9, 10 to drive crawler belt 13 in a form-fit or frictional manner.

Figure 3:
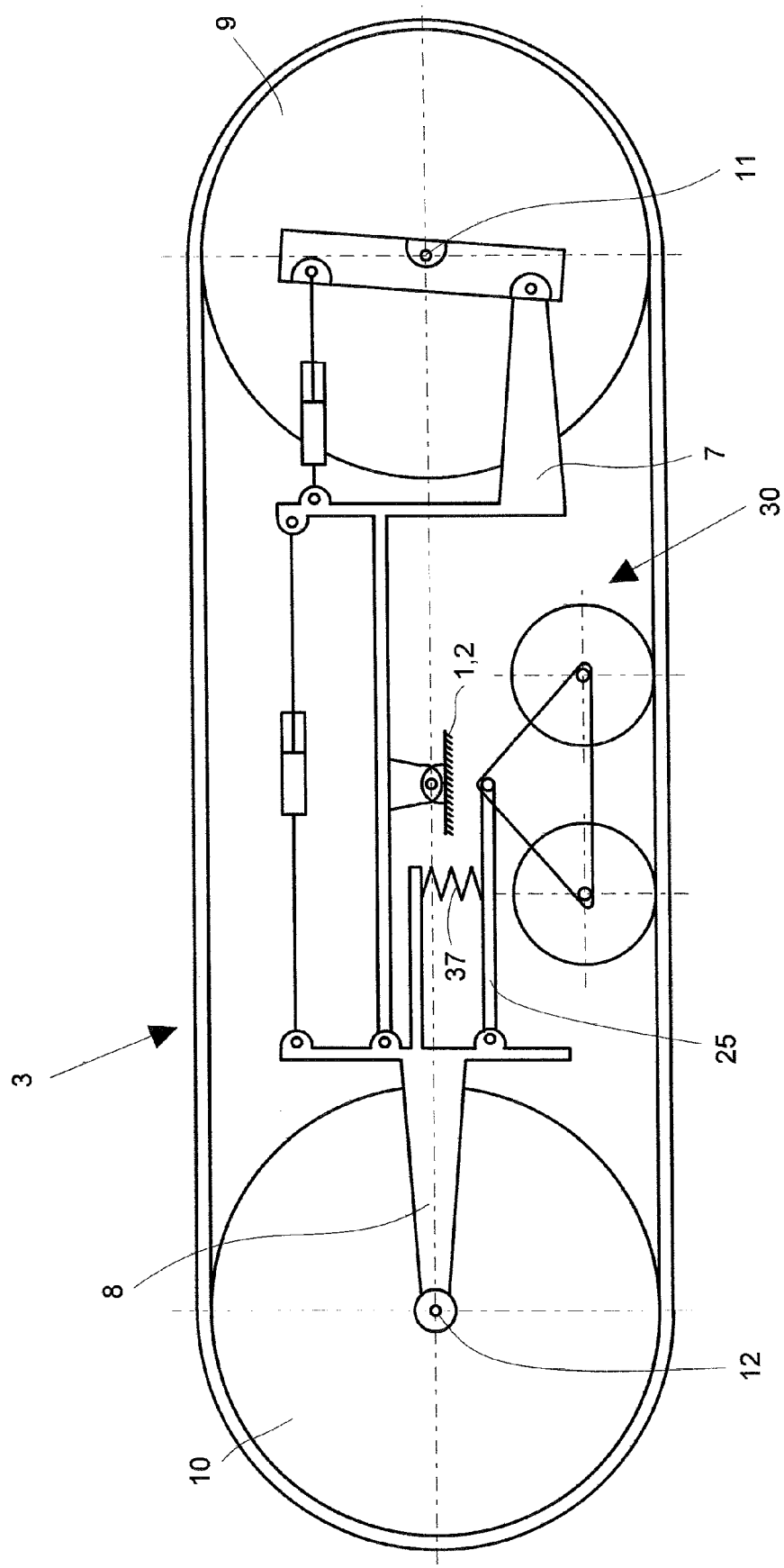
FIG. 3 shows a second inventive embodiment of the crawler track assembly.

In contrast to the first embodiment shown in FIG. 2, with the second embodiment of an inventive crawler track assembly 3 shown in FIG. 3, track-supporting roller assembly 30 is located on further subframe 8. With this crawler track assembly 3, further spring element 38 is located between intermediate frame 35 and further subframe 8.

Figure 4:
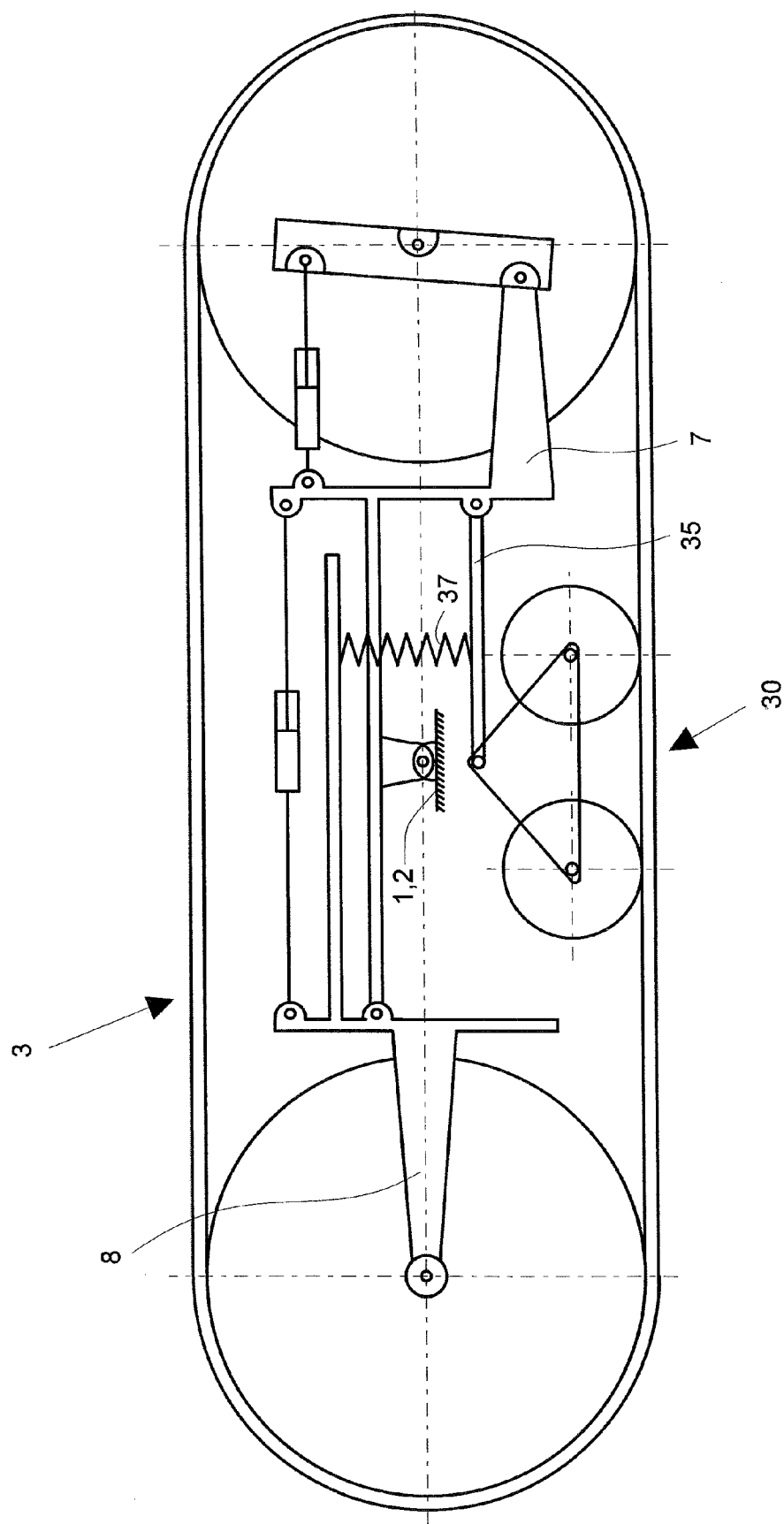
FIG. 4 shows a further, inventive embodiment of the crawler track assembly.

A third embodiment of an inventive crawler track assembly 3 is shown in FIG. 4. As with the first embodiment shown in FIG. 2, track-supporting roller assembly 30 is mounted on subframe 7. Spring element 37 is also located between intermediate frame 35 and further subframe 8, spring element 37 extending from a first region below first subframe 7 to a further region above first subframe 7. Spring element 37 penetrates first subframe 7.

It is also feasible to locate inventive crawler track assembly 3 on the front and/or rear axle of a vehicle 2 designed as a tractor.

It is within the scope of the ability of one skilled in the art to modify the exemplary embodiments described in a manner not presented, or to use them in other machines to achieve the effects described, without leaving the framework of the invention.

It will be understood that each of the elements described above, or two or more together, may also find a useful application in other types of constructions differing from the type described above.

While the invention has been illustrated and described as embodied in a track roller unit, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications

What is claimed as new and desired to be protected by Letters Patent is set forth in the appended claims:

1. A track roller unit for a vehicle, comprising at least one pivotable subframe; at least one further pivotable subframe, each of said subframes rotatably accommodating at least one land wheel, at least said one subframe being pivotably mountable on the vehicle; at least said one further subframe being pivotally mounted on said one subframe; a track-supporting roller assembly which is pivotally mounted on one of said subframes and preloaded by a damping system hinge-mounted on one of said subframes or on the other of said subframes; and an intermediate frame, said track-supporting roller assembly being mounted on said intermediate frame such that it is pivotable around a third pivot axis, said intermediate frame being pivotally mounted on at least one of said subframes.

2. A track roller as defined in claim 1, wherein said first subframe is mountable on the vehicle such that it can pivot around a first pivot axis, while said second subframe is mounted on said one subframe such that it can pivot around a second pivot axis.

3. A track roller as defined in claim 2, wherein said first pivot axis is located approximately in a middle between the land wheels.

4. A track roller as defined in claim 2, wherein said second pivot axis is located off-center between the land wheels in an area of the land wheels, while said second pivot axis is located closer to an axis of rotation of the land wheel of said further subframe than to an axis of rotation of the land wheel of said one subframe.

5. A track roller as defined in claim 1, and further comprising at least one damping element located between said one subframe and said further subframe, said damping element being connected with said one subframe and said further subframe.

6. A track roller as defined in claim 5, wherein said damping element is hinge-mounted on one of said subframes in a position selected from the group consisting of above, below, and both in relationship to said second piviot axis.

7. A track roller as defined in claim 5, wherein said damping element is configured as a piston-cylinder unit.

8. A track roller as defined in claim 5, wherein said damping element is fixedly mounted on one of said subframes.

9. A track roller as defined in claim 2, wherein said damping element is connected with one of said subframes in a position selected from the group consisting above and below with respect to said first pivot axis.

10. A track roller as defined in claim 1, wherein said third pivot axis is located approximately in a middle between the land wheels in an area between the land wheels and below said first pivot axis and below said second pivot axis.

11. A track roller as defined in claim 1, wherein said track-supporting roller assembly includes a pendulum with several track-supporting rollers, said pendulum being pivotally connected with said intermediate frame.

* * * * *